United States Patent
Xie

(10) Patent No.: US 11,485,398 B2
(45) Date of Patent: Nov. 1, 2022

(54) STROLLER FRAME AND STROLLER

(71) Applicant: CYBEX GmbH, Bayreuth (DE)

(72) Inventor: Liang Xie, Kunshan (CN)

(73) Assignee: CYBEX GmbH, Bayreuth (DE)

(*) Notice: Subject to any disclaimer, the term of this patent is extended or adjusted under 35 U.S.C. 154(b) by 0 days.

(21) Appl. No.: 17/277,656

(22) PCT Filed: Sep. 10, 2019

(86) PCT No.: PCT/EP2019/074039
§ 371 (c)(1),
(2) Date: Mar. 18, 2021

(87) PCT Pub. No.: WO2020/058029
PCT Pub. Date: Mar. 26, 2020

(65) Prior Publication Data
US 2021/0347402 A1 Nov. 11, 2021

(30) Foreign Application Priority Data
Sep. 18, 2018 (DE) .................... 20 2018 105 345.0

(51) Int. Cl.
*B62B 7/06* (2006.01)
(52) U.S. Cl.
CPC ........ *B62B 7/062* (2013.01); *B62B 2206/003* (2013.01)
(58) Field of Classification Search
CPC . B62B 7/062; B62B 2206/003; B62B 5/0056; B62B 9/00; B62B 5/0033;
(Continued)

(56) References Cited

U.S. PATENT DOCUMENTS 5,937,961 A * 8/1999 Davidson .................. B62B 9/00
180/166
6,298,949 B1 * 10/2001 Yang ...................... B62B 5/0414
188/19

(Continued)

FOREIGN PATENT DOCUMENTS

| CN | 1136910 A | * | 12/1996 | |
| CN | 103072615 A | * | 5/2013 | ............. B62B 9/082 |

(Continued)

OTHER PUBLICATIONS

Translated DE-4328567-A1 (Year: 2021).*

(Continued)

*Primary Examiner* — James A Shriver, II
*Assistant Examiner* — Ian Bryce Shelton
(74) *Attorney, Agent, or Firm* — Schwegman Lundberg & Woessner, P.A.

(57) ABSTRACT

The invention relates to a stroller frame, comprising at least one motor, in particular an electric motor, for a supported drive of the stroller frame, at least one adjustment device for adjusting, in particular sliding and/or pivoting, at least one adjustable component of the stroller frame from a first position into at least one second position, and at least one coupling device, comprising at least one switching device, such that the potential drive output of the at least one motor is changed, in particular reduced, by at least one adjustment process using the adjustment device.

14 Claims, 4 Drawing Sheets

Figure 1:
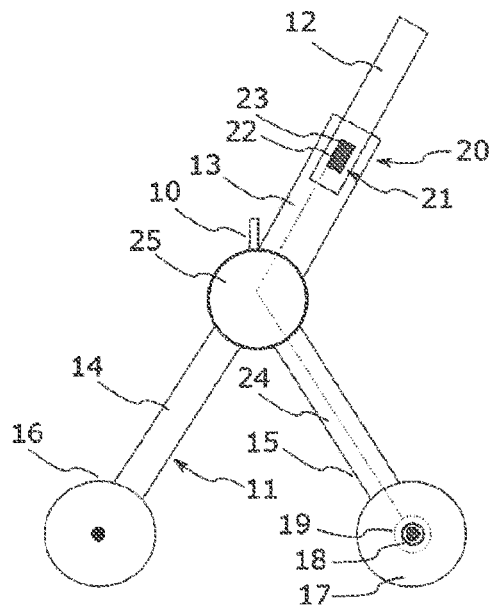

(58) Field of Classification Search
CPC ....... B62B 5/0069; B62B 5/0073; B62B 9/08; B62B 7/06; B60L 2200/30
See application file for complete search history.

(56) References Cited

U.S. PATENT DOCUMENTS

| | | | | |
|---|---|---|---|---|
| 7,987,933 | B1 * | 8/2011 | McClellan | B60K 1/00 180/65.1 |
| 8,033,348 | B1 * | 10/2011 | Parkhe | B62B 9/085 180/19.1 |
| 9,796,402 | B1 * | 10/2017 | Suarez | B62B 5/065 |
| 2005/0225056 | A1 * | 10/2005 | Dotsey | B62B 9/20 280/642 |
| 2008/0047766 | A1 * | 2/2008 | Seymour | B62B 9/00 180/65.1 |
| 2016/0101803 | A1 * | 4/2016 | Ahlemeier | B62B 9/08 180/167 |
| 2018/0245649 | A1 * | 8/2018 | Peng | F16D 65/28 |
| 2020/0059177 | A1 * | 2/2020 | French | B62B 9/00 |
| 2021/0016816 | A1 * | 1/2021 | Schillinger | B62B 9/08 |
| 2021/0078624 | A1 * | 3/2021 | Powell | B62B 9/00 |

FOREIGN PATENT DOCUMENTS

| | | | | |
|---|---|---|---|---|
| CN | 205239598 U | * | 5/2016 | |
| DE | 4328567 A1 | * | 3/1995 | ............... B62B 9/00 |
| DE | 4328567 A1 | | 3/1995 | |
| DE | 10229270 A1 | * | 1/2004 | ............... B60L 53/80 |
| DE | 202007008851 U1 | * | 10/2008 | ............... B62B 9/00 |
| DE | 202010016119 U1 | * | 2/2011 | ........... B62B 5/0033 |
| DE | 202011102790 U1 | * | 12/2011 | ............. B62B 7/008 |
| DE | 102013216679 A1 | | 2/2015 | |
| DE | 202016003937 U1 | * | 9/2016 | ............. B62B 7/062 |
| DE | 202015106061.0 U1 | | 2/2017 | |
| EP | 1459957 A1 | * | 9/2004 | ............. B62B 9/104 |
| EP | 2332806 A2 | | 6/2011 | |
| EP | 2332806 A2 | * | 6/2011 | ............... B62B 9/00 |
| KR | 200348254 Y1 | * | 4/2004 | |
| KR | 20160065623 A | * | 6/2016 | |
| RU | 2471665 C2 | * | 1/2013 | ............... B62B 9/20 |
| TR | 201313383 A | * | 6/2015 | |
| WO | WO-0136248 A1 | * | 5/2001 | ........... B62B 5/0026 |
| WO | WO-2017042959 A1 | * | 3/2017 | ............... B62B 9/20 |
| WO | WO-2020058029 A1 | | 3/2020 | |

OTHER PUBLICATIONS

Translated EP-2332806-A2 (Year: 2021).*
"International Application No. PCT/EP2019/074039, International Search Report and Written Opinion dated Jan. 13, 2020", (Jan. 13, 2020), 16 pgs.
"International Application No. PCT/EP2019/074039, International Preliminary Report on Patentability dated Mar. 23, 2021", (w/ English Translation), 6 pgs.

* cited by examiner

STROLLER FRAME AND STROLLER

PRIORITY CLAIM TO RELATED APPLICATIONS

This application is a U.S. national stage filing under 35 U.S.C. § 371 from International Application No. PCT/EP2019/074039, filed on 10 Sep. 2019, and published as WO2020/058029 on 26 Mar. 2020, which claims the benefit under 35 U.S.C. 119 to German Application No. 20 2018 105 345.0, filed on 18 Sep. 2018, the benefit of priority of each of which is claimed herein, and which applications and publication are hereby incorporated herein by reference in their entirety.

DESCRIPTION

The invention relates to a motorized stroller frame and a corresponding stroller.

Motorized strollers are known in principle. These may be configured to be moved solely by motor power. Furthermore, it is known in principle to provide strollers with motor assistance that support the driving force of a person operating the stroller, but do not provide assistance when no force is exerted by the operator.

The known concepts already provide a useful support for the person operating the stroller. However, these concepts are still considered to be comparatively little user-friendly and in particular in need of improvement from a safety point of view.

It is therefore object of the invention to propose a motorized stroller frame which is as simple as possible, requires as little effort as possible and is robust, as well as a corresponding stroller which allows the person operating the stroller, in particular, to operate the stroller in a simple, comfortable and safe manner.

This object is solved in particular by a stroller frame according to claim 1.

In particular, the task is solved by a stroller frame comprising at least one motor (in particular electric motor) for (preferably supported) driving the stroller frame, at least one adjustment device for adjusting (in particular sliding and/or pivoting) at least one adjustable component of the stroller frame (e.g. at least one frame part, in particular pusher or pusher section) from a first position into a second position, and at least one coupling device (preferably comprising or forming a, in particular electrical or electronic, switching device) in such a way that an adjustment by the adjusting device causes a change, in particular a reduction, of a (potential or maximum possible) drive power of the at least one motor.

A core idea of the invention is to use an adjustment device which is provided anyway for adjusting an adjustable component of the stroller frame (such as, for example, a device for adjusting a pusher position, e.g., a pusher length and/or an angle between individual pusher components) in order to thereby influence (control) the potential (or maximum possible) drive power of the at least one motor.

Alternatively or additionally, the above object is solved by a stroller frame, in particular as further described above and/or below, comprising at least one motor, in particular electric motor, preferably for a supported drive of the stroller frame, at least one adjustment device for adjusting, in particular sliding and/or pivoting, at least one adjustable component of the stroller frame between at least two different positions, and at least one sliding contact between the adjustable component of the stroller frame and another component of the stroller frame, wherein an electrical contact is realized by the sliding contact preferably at least in a first and/or a third position of the adjustable component and, possibly, a contact is not realized in at least a second position. A third position need not mean that a second position can also be assumed, but initially serves only for the conceptual delimitation of the various positions.

With such a sliding contact, the operation of the stroller frame can be facilitated in a simple manner.

The sliding contact can be designed such that electrical contacting is possible over a displacement path of at least 2 cm, preferably at least 5 cm, still further preferably at least 7 cm and/or over a rotation angle of at least 10°, preferably at least 30°, still further preferably at least 60° of the respective adjustable components relative to one another.

The sliding contact can be designed such that electrical contacting is provided in all (possible) positions or such that no electrical contacting is formed in at least one position (correspondingly, the electrical circuit is thus interrupted). For example, electrical contacting may be enabled for at least two or at least four or a continuum of different relative positions or orientations and/or interruption of contacting may be enabled for at least two or at least four or a continuum of different positions or orientations.

Preferably, the stroller frame or stroller comprises at least one (first) control device, for controlling, in particular regulating, a power of the at least one motor and/or a speed of the stroller or stroller frame.

In this context, controlling a power or changing a drive power can also mean a reduction to zero, i.e. that, if necessary, no (drive) power is available at all. In particular, by controlling, in particular regulating, it can be understood that at least two, preferably at least three, possibly at least five different values of the respective parameter (e.g. power values) are adjustable or can be set.

The object is further solved by a stroller, for example a children's sports car, buggy or similar vehicle for children, comprising a stroller frame of the above type. The stroller frame may be formed separately or separably from a receiving unit for the child. Alternatively, in the form of the stroller, there may be a structural (possibly inseparable) unit between the stroller frame and the receiving unit.

The above-mentioned object is further solved by using an adjustment device for adjusting, in particular sliding and/or pivoting of at least one adjustable component of a stroller frame, in particular of the type described above or below, or of a stroller, in particular of the type described above or below, from a first position into a second position, for controlling a (potential or maximum possible) drive power of at least one motor.

The above-mentioned object is further solved by a method for controlling a potential drive power of at least one motor of a stroller frame, in particular of the type described above or below, or of a stroller, in particular of the type described above or below, wherein the drive power is changed, in particular reduced, via at least one adjustment device for adjusting, in particular sliding and/or pivoting, of at least one adjustable component of the stroller frame or stroller from a first position into a second position. Insofar as functional features of the stroller frame or stroller are described above and below, these are intended to be understood such that a corresponding method step can be carried out. In this respect, the corresponding device features (such as, for example, adjustment device) are not necessarily decisive in terms of the method, but the method steps as such (i.e., for example, the adjusting or the adjusting process). Of course, corresponding device features (such as, for example, a sliding contact), as described above and below, can also be present within the method.

The stroller frame or stroller may comprise at least one battery, in particular an accumulator. Optionally, a device may be provided to charge the accumulator during a braking operation.

In particular, according to the invention, an electric circuit comprising a drive unit (motor) and a battery (accumulator) may be openable or closable by a (preferably single, in particular manual) actuation by the stroller user. Such a (manual) actuation can be, for example, a pushing of an upper pusher section into a lower pusher section. Such an actuation is usually associated with the intention of bringing the stroller (or the stroller frame) into a resting or intermediate position. This means that then with comparatively little effort a switching off or shutting down (or transferring to idle) the drive unit (the motor) and/or interruption to the battery (the accumulator) is possible. In an analogous manner, an activation or contacting of the drive unit (of the motor) can take place during a reconstruction (or a transfer to the functional position) (namely, possibly, without further actuation steps).

A potential drive power of the at least one motor is to be understood in particular as that power which the motor can (maximally) deliver when the first position or the second position is taken. The actual drive power may possibly be the same in the first position as well as in the second position during the use of the child seat, or it may also be zero (for example, if due to another influencing variable, such as for example a corresponding, possibly second, control device, the power is controlled, in particular regulated). However, it may also be the case that the drive power of the at least one motor in the first position is always different from the second position, i.e. the first or second position directly influences (adjusts) the drive power of the at least one motor. However, it is preferred that further adjustment possibilities exist here, so that according to the invention it is at least essentially a matter of the (potential) maximum drive power.

The adjustment device as well as the coupling device can be formed by separate parts (assemblies) or (at least partially) by a common part/element or common parts/elements (the same assembly). In this respect, it can also be an integrated adjusting and coupling device.

By an adjustment device is meant, in particular, a device that enables two components of the stroller frame (for example, two frame parts, or a braking device and another component, in particular a wheel) to be changed with respect to their relative position and/or relative orientation. An adjustment may in particular comprise a sliding (preferably pushing together), possibly telescopically, and/or a pivoting, in particular folding. The respective (first or second) positions are preferably different configurations of the adjustable component, in which the latter remains at least substantially spatially-geometrically the same or does not change its structure. However, there may also be a structural change of the adjustable component in itself (for example, an enlargement of the adjustable component or a reduction of the adjustable component and/or a deformation of the adjustable component), The adjustment preferably already has a function in itself (in particular a change in a relative position of two components of the child seat with respect to each other) and is (only) shared for the change in the drive power. By the adjustment is meant in particular an adjustment in which at least one point of the adjustable component is moved away from its starting point by at least 2 cm, preferably at least 5 cm, more preferably at least 8 cm, relative to at least one point of the stroller frame or stroller outside the adjustable component.

A coupling device is to be understood as a device which can bring the adjusting process or the adjustment device into operative connection with the motor (indirectly or directly). The coupling device may be mechanical and/or electrical and/or electronic (for example). Particularly preferably, the coupling device comprises a switching device, in particular a component for (selectively) interrupting an electric circuit supplying the at least one motor with electrical energy. Overall, an adjustment of a (maximum) drive power of the at least one motor is made possible in a simple manner.

By an adjustable component of the stroller frame is meant in particular a functional component that fulfills a predetermined function, such as in particular a supporting function or a braking function. In particular, the adjustable component is not a (pure) actuating switch (e.g., not a pure on/off switch).

For example, a transfer of the stroller frame from a functional position (in which the stroller frame can be operated) to a rest or transport position (in which the stroller frame is folded) can be used to switch off the motor (or at least to reduce a maximum possible power, in particular to transfer the motor to idle).

The adjustment device is in particular a device that can be operated manually, either indirectly or directly. Particularly preferably, a (single) manual operation is sufficient to actuate the adjustment device.

Preferably, the coupling device is configured such that an adjustment by the adjustment device (in particular an at least partial pushing together or folding together of components of the stroller frame) results in the engine being switched off or in the engine being transferred to an idle state. In this way, driving/supporting by the motor can be prevented or blocked in a simple manner.

According to the embodiment, the coupling device is configured such that a power supply for the motor can be interrupted or is interrupted and/or can be achieved or is achieved by an adjustment by means of the adjustment device. For that, at least one sliding contact can be provided, for example.

In specific embodiments, the adjustment device can be designed for adjusting, in particular shortening and (partially) folding of a frame and/or a frame component, in particular a pusher and/or a pusher component. By a (partial) folding together a reduction of an angle between the two respectively considered elements preferably by at least 10°, further preferably at least 30°, optionally at least 60° or at least 90° or at least 135° or (at least approximately) 180° is to be understood. The frame part may, for example, be the pusher or a corresponding pusher section or a wheel strut (or a section of such), in particular rear wheel strut (or a section of such) or front wheel strut (or section of such).

The adjustment device can be designed for adjusting a braking device, in particular a parking brake. In this way, it can then be achieved, for example, that the actuation of a braking device (parking brake) results in the (potential) power of the motor being throttled or brought to zero, or the motor being switched off (completely).

Possibly, a sensor device may be provided which detects whether the braking device (parking brake) is applied. Such a sensor device may further (optionally) be used for setting a cradling function. For example, a cradling function can be started (only) if the braking device (parking brake) is applied. Even if no cradling function is provided (which may optionally be the case), it is advantageous if a power of the motor is reduced accordingly (or the motor is only idling or is switched off), in particular a (physical) disconnection of an electrical circuit is realized when the braking device (parking brake) is activated. If a cradling function is provided, a control device (e.g. electronic) can be configured such that a switching between an operation with possible (assist) drive and without cradling function (where the parking brake is not activated), and an operation with possible cradling function but without (assist) drive can occur.

Preferably, the braking device (parking brake) is made at least in sections of metal and/or plastic. Furthermore, the braking device (parking brake) may come into (physical) contact with at least one wheel and/or at least one axle of the stroller frame or stroller. Specifically, the braking device may be a deceleration brake or friction brake (e.g., pad, rim, disc, or drum brake) or preferably a parking brake (which locks the position of at least one wheel relative to the frame or blocks the rotation of at least one wheel relative to the frame). The braking device may act on a surface of the respective wheel (e.g., on a rim) or act on a hub.

The adjusting device for adjusting a braking device, in particular a parking brake, can be designed without a force sensor device.

If applicable, the adjusting device may be an (arbitrary) adjusting device for adjusting the adjustable components of the stroller frame from a first position to a second position, but not an adjusting device for adjusting a braking device.

The adjusting preferably comprises (or consists of) a relative movement of the adjustable component (with respect to another component or a main body of the stroller frame with respect to which the adjustable component is adjusted) of at least 3 cm, preferably at least 8 cm. A relative movement is to be understood as a movement of the adjustable component relative to the further component, in particular the main body, of the stroller frame, i.e. not (necessarily) a movement relative to a spatially fixed reference point. In principle, it may be the case that when of the adjustable component is adjusted, the adjustable component moves and yet another component with respect to which the adjustable component is adjusted moves. However, the further component may also remain immobile (relative to a fixed reference point or a main body of the stroller frame) when the adjustable component is adjusted.

Alternatively or additionally, the adjusting may comprise a (relative) rotation of the adjustable component over an angle of at least 20°, possibly at least 60° (with respect to a further component or a main body with respect to which the adjustable component is adjusted). Again, this is preferably a relative rotation, which need not necessarily correspond to a rotation performed by the adjustable component with respect to a fixed reference point in space. The adjustable component, on the one hand, and the further component (with respect to which the adjustable component is adjusted), on the other hand, can both move (with respect to a fixed reference point in space) or just the adjustable component, so that the further component does not move with respect to the fixed reference point, or vice versa.

In embodiments, the adjusting comprises a shortening (or lengthening) and/or a lowering (or raising) of the entire stroller frame or stroller. For example, the stroller can be shortened and/or lowered by at least 5%, preferably at least 20%.

In embodiments or also as an independent inventive idea, as described above and/or below, the stroller frame or the stroller, in particular the coupling device, comprises at least one sliding contact. A first sliding contact may, for example, be located in a first section, in particular upper pusher section (and/or in a wheel strut section, e.g. rear wheel strut section and/or front wheel strut section and/or in a joint), a second sliding contact may be located in a second section, in particular lower pusher section (and/or in a, possibly further, wheel strut section, e.g. rear wheel strut section and/or front wheel strut section and/or in a/the joint). If the respective or both (pusher) sections are then moved against each other, the sliding contacts can either make contact (for example, if the upper pusher section is further away from the lower pusher section or is extended) or interrupt a contact (for example, if the first section, in particular upper pusher section is closer to the second section, in particular lower pusher section or is at least partially inserted therein). At least one sliding contact (possibly exactly one sliding contact of a pair of corresponding sliding contacts) may be movable and/or spring-mounted, for example in the form of one or more spring contact pin(s). Alternatively or additionally, at least one sliding contact may be fixedly (immovably) arranged (anchored) on the corresponding pusher section. According to an embodiment, a sliding contact can be fixedly arranged (anchored) on the second section, in particular lower pusher section, and a sliding contact can be movably arranged and/or spring-mounted on the first section, in particular upper pusher section (or vice versa). In the case of a movable arrangement, a corresponding direction of movement is preferably at an angle of at least 30°, preferably (at least approximately) 90° with respect to an axial direction (possibly direction of movement) of the corresponding section (e.g. pusher section) on which the contact is arranged.

The embodiments with sliding contacts between two sections, in particular frame parts, permit a simple realization of a contact between two parts which are movable relative to one another, with a comparatively low susceptibility to faults and malfunctions, given a small installation space. In particular, the sliding contact provides for self-cleaning of the contact surfaces, so that a failure of functionality due to contamination is at least less likely. In this respect, the embodiment comprising at least one sliding contact is claimed as an independent inventive concept.

Alternatively or additionally, the coupling device may comprise at least one plug contact. For example, a plug-in recess may be arranged on one of two pusher sections and a plug-in projection (e.g. pin) may be arranged on the other pusher section (or at least connected to the corresponding pusher section, possibly non-detachably, for example via a cable and/or a rod). Thus, an electric circuit can be interrupted or closed in a simple manner.

Specifically, the coupling device may comprise at least one (pull) cable and/or at least one (pull and/or push) rod. Thus, a force transmission can be performed in a simple manner, for example to either make or break a plug-in contact.

Specifically, a (flexible) cable can be used to utilize two components (e.g. frame parts, in particular pusher sections and wheel strut) that can be pivoted against each other, such that pivoting (e.g. at least partially folding) releases a contact (by, for example, pulling a plug projection out of a plug recess).

Under a cable preferably a cable for transmitting a force and/or for transmitting an electric current is to be understood.

The first position may be (with respect to the adjustable component) a functional position. The functional position may in particular be a position in which a child can be accommodated in the stroller frame or stroller (in the case of the stroller frame, at least if a corresponding accommodation unit for the child is integrated).

If the adjustment device is designed for adjusting a braking device, the functional position may be a position in which the braking device (parking brake) is released, i.e, the stroller frame is ready to be driven in this sense. The second position may be a rest position, in particular a storage, parking, blocking and/or intermediate position.

In general, the second position may be characterized, relative to the first position, by the fact that an angle between (the) components that can be adjusted with respect to each other is smaller in the second position and/or the two adjusted components are brought closer to each other and/or are (at least partially) pushed into each other.

By a storage position is meant, in particular, a position in which the stroller frame can be stowed in a space-saving manner, but no child can be accommodated in the stroller frame (any more) (even if a corresponding accommodating unit for the child is provided). In the storage position, the stroller frame may no longer be able to stand stably (on its wheels) (but will fall over if it is not actively held by the user).

A parking position may be a position in which the stroller frame (or components thereof) is configured to be comparatively compact accordingly, but the stroller frame can still stand (stably; on its wheels) (without being actively held by a user). In the parking position, however, it is preferably no longer possible to accommodate a child (even in the presence of a corresponding accommodating unit). An intermediate position may again preferably be an intermediate position (which may or may not be locked or lockable) between the functional position and the corresponding rest position (which may then also be referred to as the end position).

In addition to the first and second positions, further positions (for example, at least one third or at least one fourth position) may generally be assumed. First and/or second and/or further position(s) may be configured to be locked or lockable.

In general, first and/or second and/or further position(s) is/are stably assumable (in particular lockable). By a stable assumption of the respective position is to be understood in particular that the position (even if or at least if there is no external force effect apart from the weight force) is held (i.e., for example, is not driven back). In contrast, a spring device can, for example, prevent a certain position from being stably assumed (at least as long as no further devices, such as locking devices, are provided). In general, therefore, the coupling and/or adjustment device may comprise at least one spring device or may be designed without a spring device.

In embodiments, the stroller frame may comprise at least one speed sensor device and/or cornering sensor device and/or at least one force sensor device. The force sensor device is preferably designed for detecting a direction and/or an amount of a force and/or a force component acting on a/the pusher and/or for detecting a variable derived from this force or force component (e.g. a torque), in particular a change over time of the force or force component or variable derived from the force.

The pusher is preferably formed as a single piece (possibly with individual parts that can be moved against each other). In particular, the pusher can have a horizontal handle. Alternatively, the pusher can also be designed in several pieces (e.g. two-piece), for example with several handles separated from each other. Optionally, a force sensor device can be provided which detects either the direction or the amount (or both) of a force and/or a force component (or a variable derived from this force or force component). This makes it possible that a corresponding control can take place based on the output of the sensor device. By output of a sensor device in particular the output of a measured value and/or the output of an average value from several measured values is to be understood.

The control can then be performed internally (by a control device provided on or in the stroller frame) and/or externally by a separate control device (such as a mobile terminal, in particular a smartphone). However, it is first of all significant that corresponding data concerning the force or variables related to the force can be generated at all. In this respect, it is advantageous, but not absolutely necessary, if the stroller frame (or the corresponding stroller) itself has a control device. Overall, a user-friendly and easy-to-manufacture stroller frame with motor assistance is proposed.

By the measurement of an amount in particular the measurement of at least one concrete amount (e.g., as a concrete value of xy Newton) is to be understood or at least the measurement of whether the force/force component has an amount that is above (or, as the case may be, at) or below (or, as the case may be, at) a threshold value(s).

With the force sensor device, in particular at least two different force directions (for example, forward and backward and/or upward and downward) can be detected and, if necessary, determined with respect to their amount, or at least four directions (for example, forward, backward, upward and downward) can be detected and, if necessary, determined with respect to their amount. Possibly, at least two different amounts (>0), preferably at least four different amounts, for example a continuum of amounts of the force (or force component or variable derived therefrom) can be detected with the force sensor device. In any case, such a force sensor device provides information in a simple manner that can advantageously be used to control the motor for driving the stroller or the stroller frame.

Optionally, several motors, in particular electric motors, may be provided for driving the stroller frame. Preferably, at least two or exactly two wheels (for example, a left wheel and a right wheel or a first lateral wheel and a second lateral wheel) are each associated with a motor. Preferably, a control device may be provided for individually controlling the motors. Alternatively or additionally, a sensor device for detecting a pushing force and/or movement of the stroller frame may be provided. By means of several (in particular at least or exactly two) motors, the pushing comfort can be improved, in particular during cornering, without having to take elaborate measures for this purpose (as, for example, in the case of only one motor with a differential gear).

Unless otherwise specified, pushing or pushing force shall be understood to mean in particular actions or forces which can be directed both forward and backward (even if in the latter case one can also speak of a pulling or a pulling force).

Insofar as (two) forces are compared and it is stated that the (two) forces are the same or different, this is generally to be understood as an abbreviation for "the same or different with respect to the direction and/or amount of the forces"— unless it follows from the context that the direction is predetermined (as, for example, in the case of a "backward force"); then a statement about the same or different forces is to refer to the amounts of the forces.

The at least one (force) sensor device may be arranged on and/or in the pusher, in particular a handle of the pusher, and/or may be arranged in and/or near a pusher attachment area. By a pusher attachment area is meant, in particular, an area where the pusher is attached to a main body of the stroller frame. By an arrangement close to the pusher attachment area is meant in particular an arrangement at a distance of less than 10 cm, preferably less than 5 cm, with respect to the pusher (where, in the case of a relatively moving pusher, the minimum distance is meant here in particular).

According to an embodiment, a method for controlling a stroller frame, in particular of the type described above (and below) or a stroller of the type described above (and below) is proposed, wherein a direction and/or an amount of a force and/or a force component acting on a pusher and/or a variable derived from this force or force component, in particular a change in time of the force or force component, is detected.

Preferably, (the) at least one control device is in operative connection with the at least one (force) sensor device, in particular such that an output of the at least one sensor is used to control the at least one motor. By that, a simple and reliable detection of the force (or other variable, such as the current movement) can be performed.

In one embodiment, (the) at least one sensor device is designed to detect forces and/or force components acting on the pusher and/or variables derived therefrom at at least two different locations. In particular, this detection can take place at a first (e.g. left) and a second (e.g. right) side of the pusher, in particular a first (e.g. left) and a second (e.g. right) side of a handle and/or at two different, in particular in each case laterally arranged, handles. Insofar as reference is made here and in the following to a left or right side, this refers in particular to a left or right side, respectively, which results from the viewing direction of the person operating the stroller frame or the stroller.

In a specific embodiment, the sensor device is designed to determine force components in the direction of movement and/or against the direction of movement (horizontally in each case) and/or upwards and/or downwards (vertically in each case). Alternatively or additionally, corresponding components of a temporal derivative (or a temporal change) can be determined.

If acting forces (and/or force components and/or force-dissipating variables) are detected at several different locations, the control device can be designed such that the corresponding drive wheels (or, if applicable, associated motors) are controlled, for example depending on the magnitude and duration of the (in particular horizontal) acting forces (and/or their changes over time) and/or depending on whether the (in particular horizontal) forces (and/or their changes over time) point in the same direction. A drive wheel (or correspondingly associated motor) can be controlled depending on the force applied to its side (and/or the time variation of this force) and/or on the force (and/or its time variation) applied to the other (opposite) side.

Preferably, the/a control device is adapted to control and/or regulate the output of the at least one motor, in particular based on the output of the at least one sensor device, for example in discrete steps and/or continuously.

Furthermore, the/one control device may be designed such that at least one motor is started when a first threshold of the force and/or force component and/or variable derived therefrom is exceeded. By starting the motor, it is to be understood in particular that the motor provides power for driving the stroller frame. In this sense, switching on the engine (which is then running at idle speed, for example) is not yet starting. However, starting may also mean switching on the motor (power supply) for the first time.

The control device can be designed in such a way that at least one motor is stopped or kept at constant power when a second threshold of the force and/or force component (for example an upward or downward component) and/or the variable derived therefrom is exceeded. Stopping the motor means, in particular, putting the motor into a state in which it no longer drives the stroller. Possibly, the motor can still continue to run (for example, at idle). However, it can also be understood as a final switch-off (for example, an energy interruption to the motor supply). The second threshold may be greater in amount than the first threshold.

A temporal change can basically be understood as the temporal derivation of the force (or force component) (in the mathematical sense). However, a temporal change can also be understood as $\Delta F/\Delta t$ (with finite non-infinitesimal $\Delta t$ in the range of, for example, 100 milliseconds to 1 second).

The respective or at least one control device is preferably a control device, in particular a control device for continuous (possibly linear) control of the power of the at least one motor, preferably a PID control device (where PID stands for proportional integral derivative).

Preferably, at least one brake device, in particular deceleration brake device and/or parking brake device, is provided. The deceleration braking device is preferably designed to use kinetic energy of the stroller frame or stroller (with child) for braking (and in particular to convert it into electrical energy). Alternatively or additionally, a/the control device may be provided and configured such that the parking brake device is automatically activated after a predetermined time, preferably between 3 seconds and 5 minutes (preferably between 10 seconds and 30 seconds), after a (complete) standstill of the stroller frame (after previous movement). Alternatively or additionally, a/the control device can be provided and designed such that the parking brake device is automatically activated after a standstill or a comparatively low speed has been reached after previous movement.

The braking device can be designed in particular in two stages, preferably a that there is both a deceleration brake (service brake) and a parking brake for locking a parking position (when the stroller is completely stopped). The deceleration brake may be designed such that the stroller is braked by friction (on one or more wheels) (converting kinetic energy into heat). Preferably, however, at least one motor can be used as a generator to decelerate the stroller (converting kinetic energy into electrical energy, which in turn can be used to charge one or more batteries). Any actuating device may be provided for the deceleration brake, for example a hand- or finger-operatable lever (on the pusher or handle) or another device (for example, a rotary handle or a foot pedal or the like). It is also possible, if applicable, that a graphical user interface (e.g., display, especially touch-screen) is connected to the stroller and/or has a receiver to be connectable to an external device (e.g., a smartphone with a corresponding app). The actuating device (or the receiver) may be connected to the deceleration brake (by suitable means) to apply the deceleration brake, i.e., to apply the braking force desired by the user (which may be zero or greater than zero, in particular may take more than 2 or more than 5 different values greater than zero). The deceleration brake may act as long as the actuating device is actuated, or until the stroller is stopped entirely, at which point the parking brake may act.

The parking brake may be configured as a locking device that prevents that one or more wheels rotate. For example, the parking brake may include a pin that interacts with spokes or detests (for example, grooves) provided in a side surface of the wheel.

The parking brake may optionally be (automatically) activated immediately after, or a predetermined time after, the stroller frame or stroller has been stopped, particularly by the deceleration brake.

Preferably, the at least one parking brake device can be activated (only) electrically or electronically and released (only) manually.

The parking brake device may be pretensioned in a released state and in an activated state may not be pretensioned or be pretensioned (only) to a lesser extent. By these measures the safety during operation is improved.

The parking brake can be actuated in various ways, for example via a switch, e.g. slide switch or push switch or a foot pedal or the like.

In particular, if the parking brake is pretensioned in the activated state, release of the parking brake is (only) possible manually, whereas activation of the brake may (only) be made possible electronically or electrically.

A/the sensor device, in particular the force sensor device, can be provided and the/a control device can be designed in such a way that at least one braking device, in particular the deceleration braking device and/or the parking braking device, is activated when a person operating the stroller releases a contact, for example via the hand and the handle. Preferably, the deceleration brake is activated with increased (maximum) force and/or the parking brake is activated (emergency braking) when it is determined that the person operating the stroller is not in contact (anymore) with the stroller and the stroller is still moving.

In one embodiment, the control device is designed such that the braking device is activated when the force sensor device detects a force that is (at least partially) directed against the current direction of movement of the stroller frame. Alternatively, in such a case, motor assistance may be provided as described above. Preferably, the motor is used as a current generator in the event of braking.

At least one indicating or signaling device may be provided to indicate to the user of the stroller frame that motor assistance is or may be present. As the case may be, a first indicating or signaling device may indicate that motor assistance is currently present, and a second indicating or signaling device may indicate that motor assistance may be present, in the sense that, depending on further parameters (for example, a maximum speed or the like), either a motor assistance is present or (if the parameters are appropriate) not.

Preferably, a/the control device of the stroller or stroller frame is configured such that the motor can be controlled, possibly regulated, depending on a rotation of at least one wheel. In particular, a control, in particular regulation of a/the motor (support drive) of the stroller or stroller frame (in addition to the force applied to the pusher) can depend on whether the wheels (or at least one wheel) rotate (rotates). Preferably, even if a force is applied (or a force threshold is exceeded), no assistance should be provided if the wheels do not rotate.

Preferably, an A/D converter device is provided which is configured to digitize an analog signal detected by the sensor device and which is preferably connected upstream of the sensor device. Specifically, the sensor device (located in the pusher) can detect an analog signal. This can be digitized (A/D converter) after acquisition (if necessary directly or without intermediate further processing) and preferably only then forwarded to the motor or a control device for controlling/regulating the motor. Advantageously, it can be taken into account thereby that possibly only comparatively small voltage differences may be generated by the sensor device and that the digital signal is less susceptible to interference from environmental influences (e.g. undefined contact resistances between sensor device and motor). Specifically, a microcontroller can be placed in the pusher (in particular at or in spatial proximity to) the sensors, which performs an A/D conversion, from which the digital signal, possibly together with identification information, in particular check digit (or a check digit block), is preferably sent to the actual controller(s) (control device(s)) of the motor (possibly several motors) (e.g. on the axis). There, an identification can take place, in particular a checksum can be formed, and the signal can be further processed and evaluated to control the motors.

In embodiments, a/the control device of the stroller or stroller frame can be configured such that a cradling function is switched on at the stroller if no pushing force is applied or if a corresponding force threshold is not reached.

Overall, the stroller or stroller frame can provide comfortable support when pushing (or pulling) the stroller. When starting with a stroller that is stationary, the user will begin to push (or pull). As a result, the horizontal component of the pushing force or pulling force will become greater than zero. At the moment when a predefined force is reached, the motor can start to support the user (with minimum power). For example, as the horizontal component of the push or pull force continues to increase (i.e., $\Delta F_{inh}/\Delta t > 0$), the assist force will also increase (i.e., $\Delta F_s/\Delta t > 0$). Thus, the horizontal component of the force can be kept (essentially) constant at the predefined force (at least if an overshoot is not considered). Of course, if there is a condition to stop the motor support, a larger force may be necessary.

In a specific embodiment of the invention, a stroller frame may be provided with a sensor device on the pusher as well as an adjustment device for the pusher, the stroller frame further including a coupling device. The coupling device may be configured such that the sensor device is included in the electrical circuit for motor control when the pusher is in a position of use, and is not included in the electrical circuit for motor control when the pusher is in a position of non-use. The change (reduction) in drive power may then be effected, for example, by an electronic circuit which permits assist drive in the presence of a sensor output signal and does not permit assist drive in the absence of a sensor output signal.

Further embodiments will be apparent from the subclaims.

Figure 2:
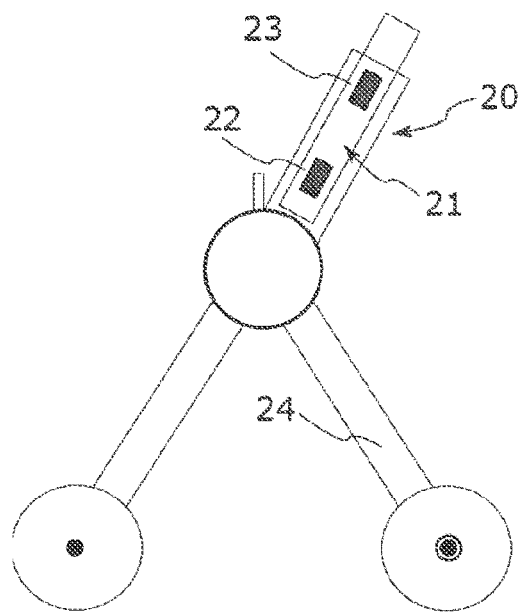
Figure 3:
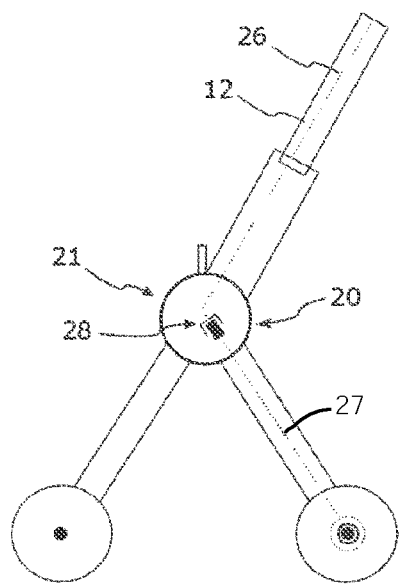
Figure 4:
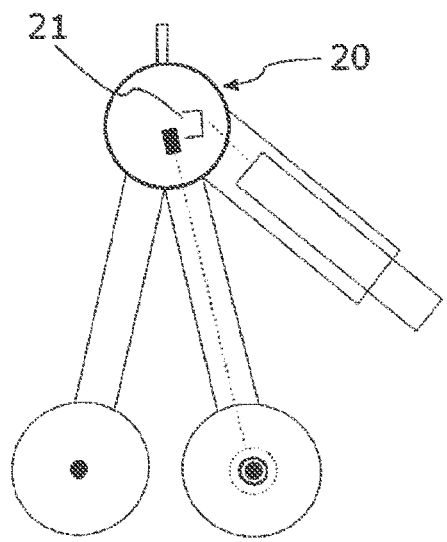
Figure 5:
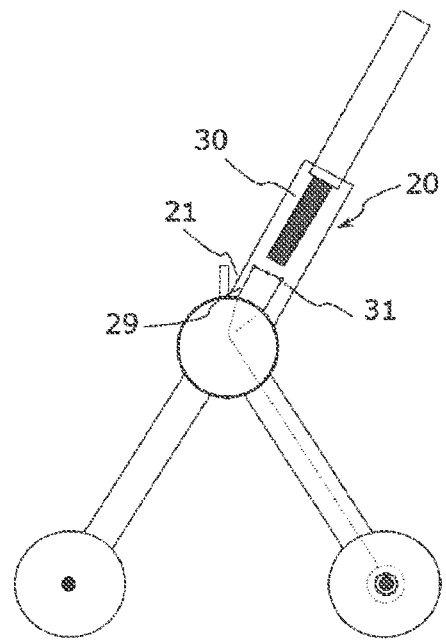
Figure 6:
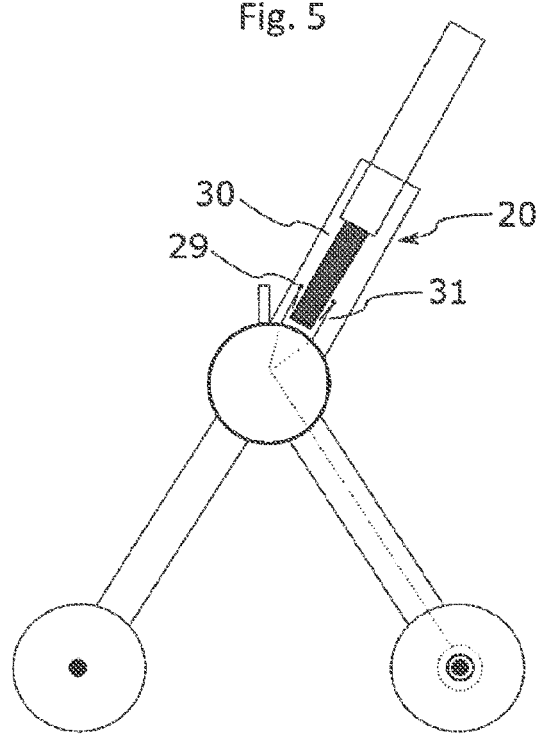

In the following, the invention is described with reference to exemplary embodiments which are explained in more detail with reference to the figures. Hereby show:

FIG. 1 a schematic side view of an embodiment of a stroller according to the invention in a first position;

FIG. 2 the stroller according to FIG. 1 in a second position;

FIG. 3 a schematic side view of a further embodiment of the stroller according to the invention in a first position;

FIG. 4 the stroller according to FIG. 3 in a second position;

FIG. 5 a section of a schematic side view of a further embodiment of the stroller in a first position;

FIG. 6 the section according to FIG. 5 in a second position; and

Figure 7:
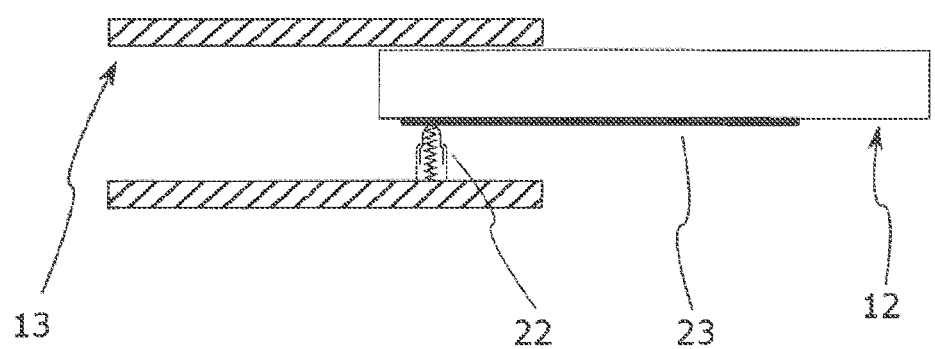

FIG. 7 a schematic representation of an upper and lower pusher section.

FIG. 7 illustrates a schematic representation of an upper and lower pusher section, according to one example.

In the following description, the same reference numerals are used for identical and similarly acting parts.

FIG. 1 shows a schematic side view of an embodiment of a stroller according to the invention in a first position. The stroller frame comprises at least one fastening device 10 for receiving a (not shown) receiving unit for receiving a child (for example a carrying shell). Furthermore, the stroller frame comprises a frame 11 which in turn comprises at least one upper pusher section 12 (preferably comprising a pusher handle), at least one lower pusher section (pusher shaft) 13, at least one, preferably two, front wheel strut(s) 14 and at least one, preferably two, rear wheel strut(s) 15. A front wheel 16 is arranged on the respective front wheel strut 14, a rear wheel 17 is arranged on the respective rear wheel strut 15. At least one rear wheel 17 can be locked via a parking brake 18. Furthermore, at least one rear wheel 17 (preferably both rear wheels 17 in each case) has assigned to it a motor 19 which can drive the (corresponding) rear wheel. For (basic) switching-on of the motor 19, an actuating button is (optionally) provided. An accumulator (not shown in detail) may be provided for driving the motor 19.

The upper pusher section 12 is slideable relative to the lower pusher section 13 by means of a (here telescopic) adjustment device 20. Depending on the displacement, a first contact 22 of a (here electrical) coupling device 21 arranged on the upper pusher section is either (as in FIG. 1) in contact with a second contact 23 arranged on the lower pusher section 13 or not (as in FIG. 2).

Specifically, it can be seen that in the position according to FIG. 1, an electrical circuit is closed so that the motor 19 can be supplied with electrical power via a (dashed) connecting cable 24. Furthermore, the (respective) lower pusher section 13 is (optionally) hingedly connected to the respective front wheel strut or rear wheel strut via a rotatable joint 25.

The first contact 22 may be a movable, possibly spring-loaded contact, and the contact 23 may be a fixed contact (or vice versa). Compared to the second contact 23, the first contact 22 may be shorter, of the same length or longer, for example less than 0.5 times, preferably less than 0.2 times or more than 1.2 times, preferably more than 1.8 times as long as the second contact.

Specifically, first and second contacts 22, 23 can form a sliding contact, in particular establish an electrical contact over a displacement path of at least 2 cm, preferably at least 5 cm.

In the illustration in FIG. 1, it is preferably a functional or use position in which the stroller or stroller frame (with child) can be used. In contrast, FIG. 2 preferably shows an intermediate or rest position in which a power supply to the motor is preferably interrupted.

Overall, an electrical circuit can be interrupted or established by the contacts (sliding contacts, if applicable) 22, 23 on at least one lower pusher section (pusher shaft) as well as on the upper pusher section by sliding the upper pusher section relative to the corresponding lower pusher section. In this case, the upper pusher section is preferably pushed in (or pulled out) until the two contacts 22, 23 are positioned contacting (or not contacting) each other. It is also conceivable to arrange several or one almost continuous (sliding) contact on one (e.g. the upper) pusher section. Thus, an adjustment of the pusher height can be realized in a simple way.

FIGS. 3 and 4 show an alternative embodiment of a stroller frame or stroller according to the invention.

Here, the upper pusher section 12 is connected to a (dashed; possibly electrically conductive) cable 26. In the position according to FIG. 3 (use position or functional position), this cable 26 is in turn connected to an (electrically conductive) cable 27, namely via a plug connection 28 of a coupling device 21. Specifically, for this purpose, the cable 27 can be connected to a plug device at the end 26 facing the cable 26, and the cable 26 can be connected correspondingly at its facing end to a plug receptacle (and/or vice versa). FIG. 4 then shows the stroller or stroller frame in an intermediate or storage position with the plug device disconnected.

By pivoting (with possibly preceding and/or simultaneous and/or subsequent sliding) the upper pusher section 12 relative to the (respective) lower pusher section 13 by means of an adjusting device 20, the plug connection 28 engaged in the functional position (use position) is decoupled, so that the electrical circuit is interrupted in the intermediate or storage position. By unfolding again, the plug connection 28 closes again.

In the embodiment according to FIGS. 3 and 4, the cable 26 may be deflected and/or (partially) wound or windable to compensate for a relative position between upper and lower pusher sections, in case of a displacement. For example, at least one deflection roller may be provided.

FIGS. 5 and 6 show a section of a further embodiment. In this embodiment, the coupling unit 21 comprises a (preferably spring-mounted) switching unit 29, which can be interrupted via a (non-electrically conductive) interruption projection (contacting pin) 30. If the interrupting projection 30 (as can be seen in FIG. 6) is displaced into or toward the switching unit 29 (by displacing the upper pusher section relative to the lower pusher section by means of the adjustment device 20), it interrupts a switch 31 there. The switch 31 can be designed here in the manner of a swinging door and (in FIG. 6) be displaced by the interrupting projection 30, so that an electric circuit is interrupted.

FIG. 7 shows a schematic representation of an upper pusher section 12 and a lower pusher section 13, to which corresponding contacts, namely a second contact 23 and a first contact 22, are assigned. A sliding contact is realized all in all via the contacts 22, 23. The first contact 22 can be pretensioned via a spring, which (here: exemplarily) is supported on the lower pusher section 13. Due to the comparatively long extension (preferably at least 3 cm or at least 8 cm) of the second contact 23, a (sliding) contact can be achieved over a comparatively large displacement path.

In FIG. 7, a sliding contact is exemplary shown for contacts 22, 23 on the pusher sections 12, 13. However, a corresponding sliding contact can also be implemented on any other (adjustable) components (such as a front wheel strut, a rear wheel strut or a joint or on a braking device). Also, in FIG. 7, the upper pusher section and lower pusher section may just be interchanged (so that, for example, the spring-loaded contact 22 is located on the upper pusher 12).

In general, then, in FIG. 7, the structures indicated by reference signs 12 and 13 may be (any) adjustable components. Either the component at reference sign 12 or the component at reference sign 13 or both are adjustable (relative to each other).

At this point, it should be noted that all of the above-described parts, considered on their own and in any combination, in particular the details shown in the drawings, are claimed to be essential to the invention. Modifications thereof are familiar to those skilled in the art.

REFERENCE SIGNS 10 fastening devic.
11 frame
12 upper pusher section
13 lower pusher section (pusher shaft)

14 front wheel strut
15 rear wheel strut
16 front wheel
17 rear wheel
18 parking brake
19 motor
20 adjustment device
21 coupling device
22 first contact
23 second contact
24 cable
25 (rotatable) joint
26 cable
27 cable
28 plug connection
29 (spring-loaded) switching unit
30 interruption projection (contact pin)
31 switch

The invention claimed is:

1. A stroller frame, comprising:
at least one electric motor, for supported drive of the stroller frame,
at least one adjustment device for adjusting, wherein adjusting includes sliding or pivoting, at least one adjustable component of the stroller frame from a first position into at least one second position, and
at least one coupling device, comprising at least one switching device, such that by a transfer of the at least one adjustable component from the first position into the at least one second position or from the at least one second position into the first position through at least one adjustment process by means of the adjustment device causes a change, wherein a change includes a reduction, of a potential drive power of the at least one motor is effected, wherein the coupling device is configured to operatively connect the adjustment process or the adjusting device with the motor.

2. The stroller frame according to claim 1, wherein
the coupling device is configured such that the least one adjustment process by the adjustment means results in the motor being switched off or the motor being transferred to an idle state.

3. The stroller frame according to claim 1, wherein
the coupling device is configured such that a power supply for the motor is interruptible or interrupted or can be or is achieved by the at least one adjustment process by means of the adjustment device.

4. The stroller frame according to claim 1, wherein
the coupling device comprises at least one sliding contact or at least one plug contact or at least one switch or at least one cable or at least one rod.

5. A stroller frame comprising:
at least one electric motor, for supported drive of the stroller frame,
at least one adjustment device for adjusting, wherein adjusting includes sliding or pivoting, at least one adjustable component of the stroller frame between at least two different positions,
at least one coupling device, comprising at least one switching device, such that by at least one adjustment process by means of the adjustment device causes a change, wherein a change includes a reduction, of a potential drive power of the at least one motor is effected,
at least one sliding contact between the adjustable component of the stroller frame and another component of the stroller frame, and
wherein by the sliding contact in at least a first and a third position of the adjustable component an electrical contact is realized and in at least a second position a contact is not realized.

6. The stroller frame according to claim 1, wherein
the adjustment device is configured for shortening or folding, a frame, a part, or a component.

7. A stroller frame comprising:
at least one electric motor, for supported drive of the stroller frame,
at least one adjustment device for adjusting, wherein adjusting includes sliding or pivoting, at least one adjustable component of the stroller frame between at least two different positions,
at least one coupling device, comprising at least one switching device, such that by at least one adjustment process by means of the adjustment device causes a change, wherein a change includes a reduction, of a potential drive power of the at least one motor is effected, and
wherein
the adjustment device is designed for adjusting a braking device, in particular ora parking brake.

8. The stroller frame according to claim 1, wherein
the adjusting comprises a relative movement of the adjustable component of at least 3 cm, or a rotation of the adjustable component over an angle of at least 20°.

9. The stroller frame according to claim 1, wherein
the first or second position(s) can be stably assumed or locked.

10. The stroller frame according to claim 1, wherein
the first position relative to the adjustable component is a functional position or the second position relative to the adjustable component is a rest position, in particular storage, parking, blocking or intermediate position.

11. The stroller frame according to claim 1, comprising:
at least one speed sensor device or at least one force sensor device, for detecting a direction or an amount of a force or a force component acting on a pusher, or for detecting a variable derived from this force or force component or a change in the force or force component over time.

12. The stroller frame according to claim 1, comprising:
at least one control device, for controlling or regulating, a power of the at least one motor or a speed of the stroller frame.

13. A stroller, a children's sports car, or a buggy vehicle for children, comprising the stroller frame according to claim 1.

14. A method for controlling a potential drive power of at least one motor of a stroller frame or a stroller according to claim 13, wherein the potential drive power is changed or reduced, via at least one adjustment device for adjusting, sliding or pivoting, at least one adjustable component of the stroller frame from a first position into a second position.

* * * * *